United States Patent [19]

De Muylder

[11] 3,876,641

[45] Apr. 8, 1975

[54] SALT OF N-METHYL-PIPERAZINE AND 1,2-DIPHENYL-3,5-DIOXO-4-N-BUTYL PYRAZOLIDINE

[75] Inventor: Jean-Marie De Muylder, Kraainem, Belgium

[73] Assignee: Societe d'Etudes et de Realisations Scientifiques en abrege "S.E.R.E.S.C.I." S.p.r.l., Brussels, Belgium

[22] Filed: Feb. 21, 1973

[21] Appl. No.: 334,212

[52] U.S. Cl.............................. 260/268 R; 424/250
[51] Int. Cl............................................ C07d 51/70
[58] Field of Search........... 260/268 HET, 311, 310, 260/268 R

[56] References Cited
UNITED STATES PATENTS

| | | | |
|---|---|---|---|
| 2,562,830 | 7/1951 | Stenzl | 260/310 |
| 3,457,273 | 7/1969 | Rumpf et al. | 260/311 |
| 3,491,190 | 1/1970 | Rumpf et al. | 260/311 |

OTHER PUBLICATIONS

J. LaBarre, et al., Arch. Intern. Pharmacodyn Therapie 160(2), 265–283 (1966).
J. LaBarre et al., Chemical Abstracts Vol. 65, p. 1244c (1966).

*Primary Examiner*—Donald G. Daus
*Assistant Examiner*—Jose Tovar
*Attorney, Agent, or Firm*—Young & Thompson

[57] ABSTRACT

The new derivative is the equimolecular salt of N-methylpiperazine and 1,2-diphenyl-3,5-dioxo-4-n-butyl-pyrazolidine.

This new derivative may be used for the treatment of rheumatic diseases, gout and other inflammatory diseases.

It is prepared by mixing separately prepared solutions of N-methylpiperazine and 1,2-diphenyl-3,5-dioxo-4-n-butyl-pyrazolidine in the same solvent, in which the desired derivative is insoluble.

1 Claim, No Drawings

SALT OF N-METHYL-PIPERAZINE AND 1,2-DIPHENYL-3,5-DIOXI-4-N-BUTYL PYRAZOLIDINE

BACKGROUND OF THE INVENTION

It is known that 1.2-diphenyl-3.5-dioxo-4-n-butyl-pyrazolidine also called "phenylbutazone" is a pharmaceutical product which has valuable properties for the treatment of rheumatic diseases.

A derivative of said phenylbutazone having unexpected advantages, when compared to phenylbutazone has now been discovered.

SUMMARY OF THE INVENTION

This invention relates to a new derivative of a substituted pyrazolidine, to the use of this new derivative and to the preparation thereof.

The new derivative of a substituted pyrazolidine is the equimolecular salt of N-methylpiperazine and 1.2-diphenyl-3.5-dioxo-4-n-butyl-pyrazolidine of the following formula.

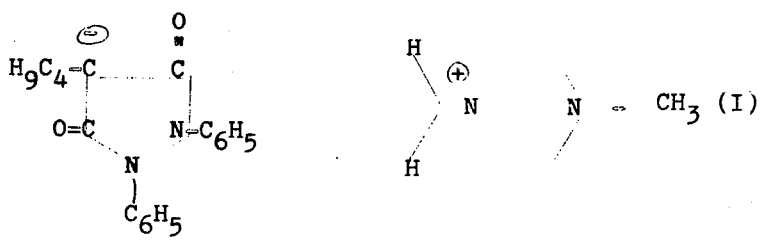

This new salt is a pharmaceutical product having antiinflammatory and analgesic properties which enable the use thereof for the treatment of diseases such as rheumatic diseases, gout and other inflammatory diseases.

This invention relates therefore also to pharmaceutical compositions, preferably in the form of capsules, tablets and suppositories, containing the new N-methylpiperazine salt as active ingredient together with usual pharmaceutical carriers or excipients.

This invention also relates to a method for preparing the new salt of N-methylpiperazine and 1.2-diphenyl-3.5-dioxo-4-n-butyl-pyrazolidine.

According to this invention, N-methylpiperazine and diphenyl-1.2-butyl-4-dioxo-3.5-pyrazolidine are both separately dissolved in the same organic solvent selected among the ketones, ethers, esters and chlorinated aliphatic hydrocarbons of the general formula:

$$C_xH_yCl_z \quad (II)$$

in which $x = 1, 2$ or $3$, $y = 0$ to $6$ inclusive and $z = 1$ to $6$ inclusive, the obtained solutions are mixed together and stirred at room temperature until a precipitate of the desired salt is obtained, said precipitate being finally separated by filtration and dried.

DETAILED DESCRIPTION OF THE INVENTION

The new salt according to this invention shows unexpected and substantial advantages, if compared to 1.2-diphenyl-3.5-dioxo-4-n-butyl-pyrazolidine or phenylbutazone. Tests in vivo on animals and human beings have shown that the salt of the formula (I) is substantially less toxic than phenylbutazone, whereas the tolerance of said salt is substantially better. Moreover, while the administration of phenylbutazone to human beings causes a substantial decrease of the excretion of electrolytes, it has been found that said excretion is normal when the salt of formula (I) is administered. Accordingly, the salt may be administered during a longer period and at higher doses, without the necessity of imposing a salt free or salt poor diet to the patient.

It has also been found that the new salt of formula (I) acts much more quickly than the phenylbutazone administered alone.

When compared to the corresponding known piperazine salt of phenylbutazone, the new N-methylpiperazine salt of phenylbutazone of this invention has a completely different behavior in the human blood system. It has been found that more than 98% of the phenylbutazone contained in the new N-methylpiperazine salt absorbed by human beings is bound to the blood plasma proteins, whereas only 30 to 50% of the phenylbutazone contained in the known unsubstituted piperazine salt of phenylbutazone are bound to the blood plasma proteins of human beings having absorbed said known salt.

Another advantage of the new N-methylpiperazine salt according to this invention compared to said known piperazine salt is due to the presence of the N-methyl substituent in the piperazine. In view of the presence of said methyl substituent, it is only possible to obtain when N-methylpiperazine is reacted with phenylbutazone an equimolecular salt, whereas the reaction of N-unsubstituted piperazine with phenylbutazone causes frequently the production of a substantial amont of a double salt containing two molecules of phenylbutazone and one molecule of piperazine, such a double salt being undesirable, since it is pharmacologically inactive.

In view of the low toxicity, high activity and lack of side effects of the new N-methylpiperazine salt of phenylbutazone, this invention also relates to pharmaceutical compositions containing the new N-methylpiperazine salt as active ingredient.

The daily dose of the new salt may vary between about 300 mg to 1,500 mg. Each capsule, tablet or suppository may contain a dose unit of 300 mg of the new salt.

Among the solvents which may be used in the process for preparing the new N-methylpiperazine salt according to this invention, the following ones are preferred: acetone, dioxane, tetrahydrofuran, ethylacetate, chloroform ($CHCl_3$), carbon tetrachloride ($CCl_4$), dichloromethane ($CH_2Cl_2$), dichloro-1.1-ethane ($CH_3$-$CHCl_2$) and dichloro-1.2-ethane ($CH_2Cl$-$CH_2Cl$).

The precipitate of the desired salt may be washed, for example with hexane or light petroleum ether and dried at room temperature or at about 50°C.

The solvent used for the preparation of a certain amount of the desired salt may be recovered by filtration of the precipitate of said salt and used again for dissolving a new fraction of N-methylpiperazine and a new fraction of the pyrazolidine derivative, so as to enable the preparation of a further amount of said salt.

EXAMPLES

The following examples 1 to 3 illustrate the method according to this invention, whereas examples 4 to 6 illustrate pharmaceutical compositions according to this invention.

EXAMPLE 1

A solution of phenylbutazone or 1.2-diphenyl-3.5-dioxo-4-n-butyl-pyrazolidine (3.084 g = 0.01 mole) in dioxane (15 ml) is added to a solution of N-methylpiperazine (1.002g = 0.01 mole) in dioxane (15 ml). The solutions are stirred at room temperature.

The precipitate is collected (3.6 g) and dried.
Melting point : 138°8 – 139.2°C
Phenylbutazone : 75.6% (calc.: 75.54%)
N-methylpiperazine : 24.39% (calc.: 24.46%)

EXAMPLE 2

To a solution of 20.04 grams (0.2 mole) of N-methylpiperazine in 300 milliliters of dichloro-1.2-ethane, a solution of 61.6 grams (0.2 mole) of diphenyl-1.2-butyl-4-dioxo-3.5-pyrazolidine in 600 milliliters of dichloro-1.2-ethane is added.

After stirring at room temperature during about two hours, the crystals are separated by filtration, washed with hexane and dried at room temperature. 76.9 grams of the desired salt are obtained (Yield : 95%).

EXAMPLE 3

A solution of diphenyl-1.2-butyl-4-dioxo-3.5-pyrazolidine (308 g) in acetone (300 ml) is added to a solution of N-methylpiperazine (100 g) in acetone (500 ml). The mixture is stirred for 2 hours.

The crystals are collected on a filter, washed with 250 ml of acetone and dried at room temperature. 383g of pure desired salt area obtained. (Yield : 94%).

| EXAMPLE 4 TABLET | |
|---|---|
| New salt of formula (I) | 300 mg |
| Corn Starch | 120 mg |
| Talc | 70 mg |
| Magensium stearate | 10 mg |

| EXAMPLE 5 SUPPOSITORY | |
|---|---|
| New salt of formula (I) | 300 to 500 mg |
| Cocoa butter or suppository mass | q.s. for one suppository |

| EXAMPLE 6 CAPSULE | |
|---|---|
| New salt of formula (I) | 300 mg |
| Talc | 70 mg |
| Titanium oxide | 50 mg |
| Magnesium stearate | 10 mg |
| Dyestuffs (tartrazine and indigotine) | q.s. |

What I claim is:

1. Equimolecular salt of N-methylpiperazine and 1.2-diphenyl-3.5-dioxo-4-n-butyl-pyrazolidine.

* * * * *